United States Patent
McMaster et al.

[11] Patent Number: 5,968,220
[45] Date of Patent: Oct. 19, 1999

[54] PROCESS FOR MODULATED CRYOGENIC QUENCHING OF GLASS SHEETS

[75] Inventors: Ronald A. McMaster, Perrysburg; Kenneth R. Kormanyos, Sylvania, both of Ohio

[73] Assignee: Glasstech, Inc., Perrysburg, Ohio

[21] Appl. No.: 09/127,323

[22] Filed: Jul. 31, 1998

[51] Int. Cl.[6] .......................... C03B 27/00; C03B 27/02
[52] U.S. Cl. ............................... 65/114; 65/104; 65/115
[58] Field of Search ................ 65/29.1, 95, 104, 65/114, 115, 118, 119, 160, 348, 116

[56] References Cited

U.S. PATENT DOCUMENTS

| | | |
|---|---|---|
| 2,026,165 | 12/1935 | Goodwillie . |
| 2,259,727 | 10/1941 | Bowers . |
| 3,249,415 | 5/1966 | McMaster et al. . |
| 3,701,266 | 10/1972 | Chisholm . |
| 3,762,902 | 10/1973 | Wagner et al. . |
| 3,775,087 | 11/1973 | Ritter, Jr. . |
| 3,801,397 | 4/1974 | Casserley . |
| 3,869,876 | 3/1975 | Gardent et al. . |
| 3,883,339 | 5/1975 | Michalik et al. . |
| 3,929,442 | 12/1975 | Neely, Jr. . |
| 4,018,590 | 4/1977 | Imler . |
| 4,190,473 | 2/1980 | Soecknick et al. . |
| 4,578,102 | 3/1986 | Colmon et al. . |
| 4,664,689 | 5/1987 | Davis . |
| 5,151,119 | 9/1992 | Clements et al. . |
| 5,772,717 | 6/1998 | Kirschner et al. . |

FOREIGN PATENT DOCUMENTS 2 650 997   2/1991   France .

OTHER PUBLICATIONS

Introduction to Ceramics By Kingery et al., pp. 830–831, 1976.

*Primary Examiner*—Steven P. Griffin
*Attorney, Agent, or Firm*—Brooks & Kushman P.C.

[57] ABSTRACT

A process and apparatus (26) for quenching a heated glass sheet by directing modulated cryogenic flows (36) that is initially completely liquid (42) toward the oppositely facing surfaces (38) of the glass sheet to quench the glass sheet. The modulated cryogenic flows (36) can be started and fully stopped to provide flow pulses and can also be continuous and have periodic increased flow pulses.

2 Claims, 2 Drawing Sheets

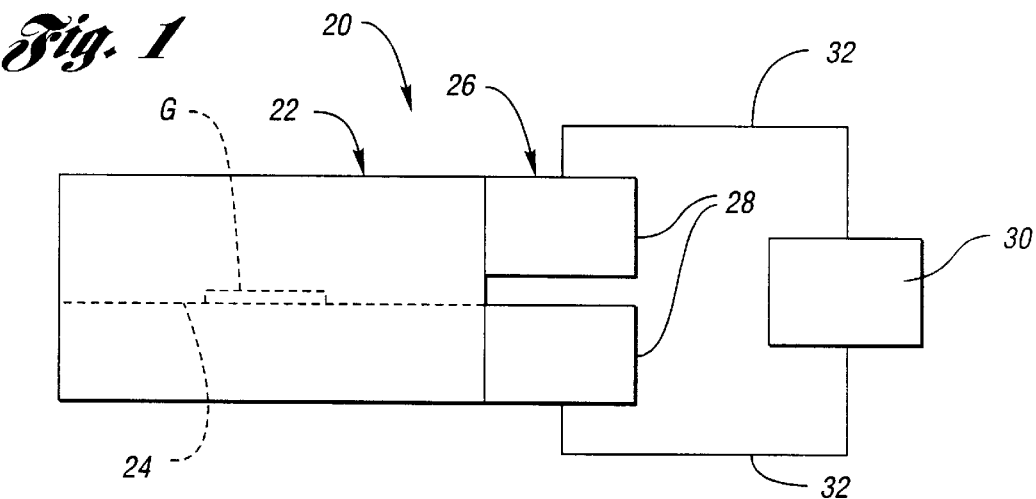
Fig. 1
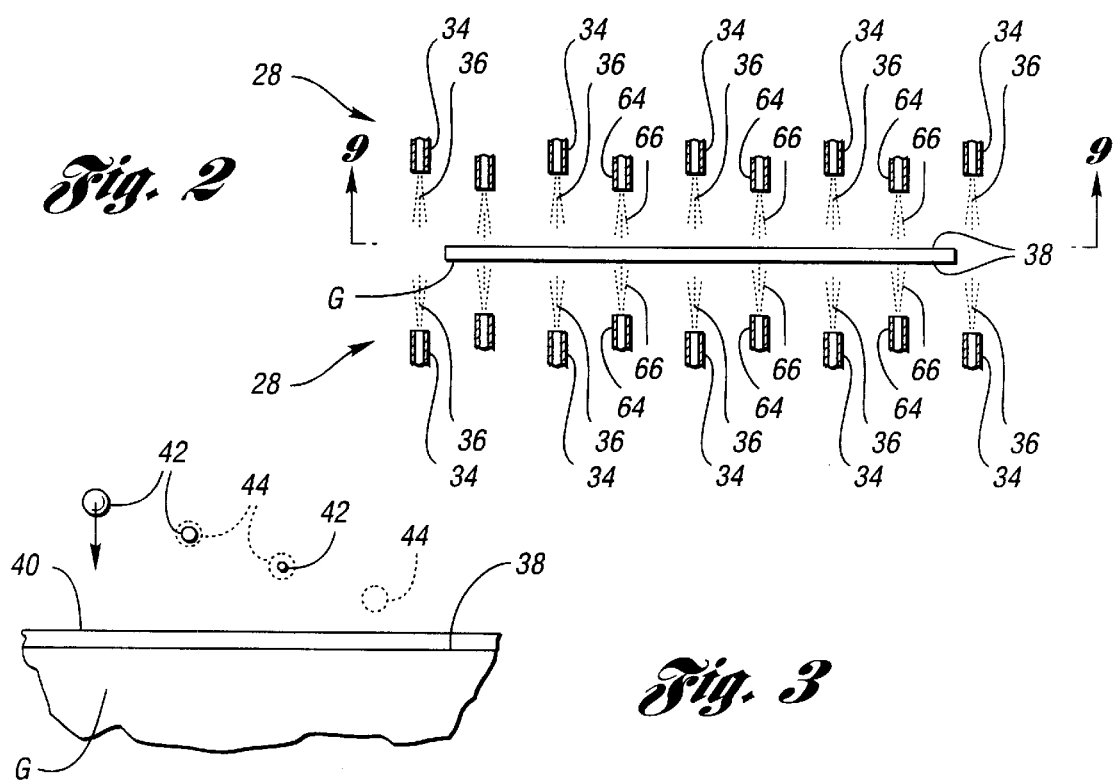
Fig. 2
Fig. 3
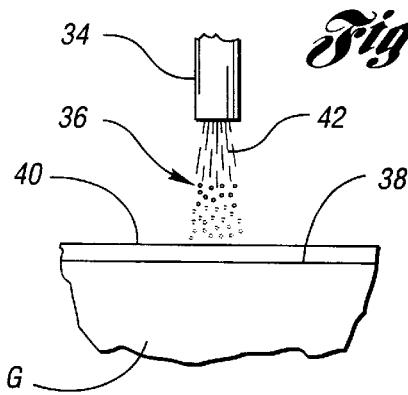
Fig. 4
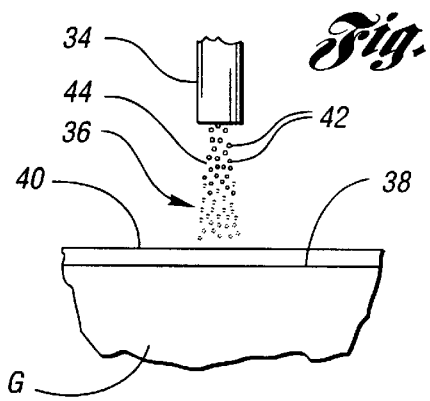
Fig. 5

5,968,220

PROCESS FOR MODULATED CRYOGENIC QUENCHING OF GLASS SHEETS

TECHNICAL FIELD

This invention relates to a process and apparatus for providing modulated cryogenic quenching of a heated glass sheet.

BACKGROUND ART

U.S. Pat. No. 5,772,717 Kirschner et al. discloses a tempering method using a two phase flow of cryogen for spraying surface layers of an article, such as a glass sheet, with a two phase flow of coolant consisting essentially of a liquid and a vapor. This spraying of the coolant on the surface layers is disclosed as being done so the liquid does not accumulate on the surface layers as a film.

References cited in the above referenced Kirschner et al. patent include U.S. patents: U.S. Pat. No. 2,026,165 Goodwillie; U.S. Pat. No. 2,259,727 Bowers; U.S. Pat. No. 3,701,266 Chhisholm; U.S. Pat. No. 3,762,902 Wagner et al.; U.S. Pat. No. 3,775,087 Ritter, Jr.; U.S. Pat. No. 3,869,876 Gardent et al.; and U.S. Pat. No. 4,018,590 Imler as well as a publication entitled INTRODUCTION TO CERAMICS by Kingery et al., pp. 830–831, 1976. Additional references cited in a search report for a corresponding European application include United States patents: U.S. Pat. No. 3,801,397 Casserley; U.S. Pat. No. 3,883,339 Michalik; U.S. Pat. No. 3,929,442 Neely; U.S. Pat. No. 4,190,473 Soecknick; and U.S. Pat. No. 4,578,102 Colmon; and French patent document 2,650,997.

DISCLOSURE OF INVENTION

An object of the present invention is to provide an improved process for quenching a glass sheet having oppositely facing surfaces.

In carrying out the above object, the quenching is provided by directing modulated cryogenic flows that are initially completely liquid toward the oppositely facing surfaces of the glass sheet to quench the glass sheet and wherein the glass sheet quenching process in one practice is provided by starting and fully stopping the cryogenic flows to provide flow pulses, and wherein the glass sheet quenching process in another practice is performed with the cryogenic flows being continuous and having periodic increased flow pulses.

BRIEF DESCRIPTION OF DRAWINGS

FIG. 1 is a schematic side elevational view of a glass sheet processing system constructed in accordance with the invention to provide quenching of glass sheets.

FIG. 2 is an elevational view that illustrates quench units of the system for providing cryogenic quenching.

FIG. 3 is a view that illustrates the manner in which a cryogenic liquid flow completely evaporates before penetrating a gas boundary layer of the glass sheet surface being quenched.

FIG. 4 is a schematic view illustrating a cryogenic flow that is initially completely liquid.

FIG. 5 is a view similar to FIG. 4 illustrating a cryogenic flow that is initially two phase as a liquid and a gas.

BEST MODES FOR CARRYING OUT THE INVENTION

Figure 6:
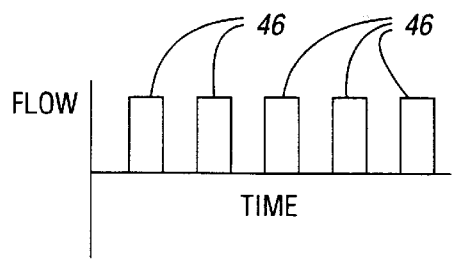
FIG. 6 illustrates the cryogenic flow as being modulated by providing pulses that begin and completely stop between adjacent pulses.

With reference to FIG. 1 of the drawings, a system generally indicated by 20 is constructed in accordance with the invention to provide cryogenic quenching of glass sheets as is hereinafter more fully described.

With continuing reference to FIG. 1, the system 20 includes a furnace 22 including a conveyor 24 for providing heating of glass sheets G. A quench station 26 of the system includes apparatus that has spaced quench units 28 illustrated as being in lower and upper positions such that a heated glass sheet to be quenched is positioned therebetween as also illustrated in FIG. 2. This quenching of the heated glass sheet can be used to provide annealing, heat strengthening or tempering. As is hereinafter more fully described, the system 20 illustrated in FIG. 1 also includes a control 30 having connections 32 for controlling the operation of the quench units 28 as is also hereinafter more fully described.

As illustrated in FIG. 2, each quench unit 28 includes an array of nozzles 34 for providing cryogenic flows 36. Each of the glass sheet surfaces 38 when located in the quench unit ambient has a gas boundary layer 40 as illustrated in FIG. 3. This gas boundary layer 40 will normally be on the order of a fraction to several thousandths of an inch thick. The cryogenic flows 36 include a liquid 42 that preferably completely vaporizes before penetrating the gas boundary layer 40 of the glass sheet G on each of its surfaces 38. More preferably, the liquid 42 completely vaporizes before reaching the gas boundary layer 40. Radiation from the glass sheet G surface 38 supplies the heat of vaporization that vaporizes the cryogenic liquid droplets 42 so as to provide cooling thereof that quenches the glass sheet in addition to forced convection cooling provided by the gas flow impingement with the glass sheet surface after passage through the gas boundary layer 40. It should be noted that the initial gas boundary layer 40 will be the quench unit ambient which is normally atmospheric air. However, subsequent to commencement of the quenching, the vaporized gas provided by the cryogenic liquid and any gas supplied therewith will become part or all of the boundary layer.

The cryogenic flows 36 are initially completely liquid 42 and subsequently break into droplets that preferably vaporize into the gas as previously described before penetrating the gas boundary layer 40 on the glass sheet surface 38. This is thus different from FIG. 5 where the cryogenic flow 36 is illustrated as initially being the liquid 42 and a gas 44. More specifically, the cryogenic flow 36 illustrated in FIG. 5 is shown as initially spraying droplets of the cryogenic liquid 42 and the gas 44.

It should be noted that the cryogenic liquids utilized will normally be nitrogen, oxygen, argon or air as well as mixtures thereof and that these liquids all have a boiling point that is less than minus 180° C. at one atmosphere of pressure. Thus, the descriptor "cryogenic" as utilized in this application is intended to refer to liquids having a boiling temperature in that range.

Figure 7:
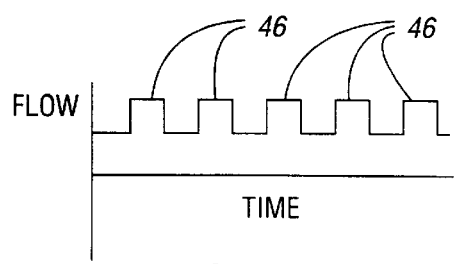
FIG. 7 is a view similar to FIG. 6 illustrating the cryogenic liquid flow as being continuous with periodic increased flow pulses.
Figure 8:
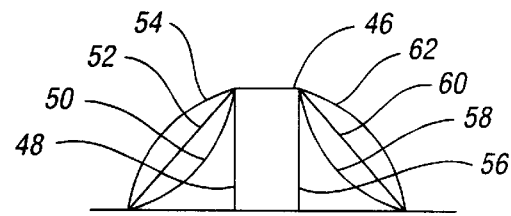
FIG. 8 is a view that illustrates different ways each cryogenic flow pulse can be increased and decreased.

The control 30 of the quench units 28 as shown in FIG. 1 is utilized to direct modulated cryogenic flows 36 that are initially completely liquid 42 toward the oppositely facing surfaces 38 of the glass sheet as shown in FIG. 2. This modulated flow is further illustrated in FIGS. 6 through 8. More specifically, FIG. 6 illustrates the cryogenic flows 36 as being completely started and stopped to provide flow pulses 46 with intervening pauses. Furthermore, FIG. 7 illustrates the cryogenic flows as being continuous and having periodic increased flow pulses 46 between which the cryogenic flow continues at a reduced level. Furthermore, FIG. 8 illustrates the manner in which the pulses 46 can increase by a step increase as illustrated by 48, increase at a continually increasing rate as illustrated by 50, increase at a uniform rate as illustrated by 52, or increase at a continually decreasing rate as illustrated by 54. Likewise, the pulse 46 can decrease by a step decrease as illustrated by 56, decrease at a continually decreasing rate as illustrated by 58, decrease at a uniform rate as illustrated by 60, or decrease at a continually increasing rate as illustrated by 62. Of course, the duration of the pulse 46 at its peak level can vary from being instantaneous to however long is most effective, except of course for the case when the pulse has both a step increase and a step decrease which thus must have a peak value that is at least of some extent as opposed to being instantaneous.

Figure 9:
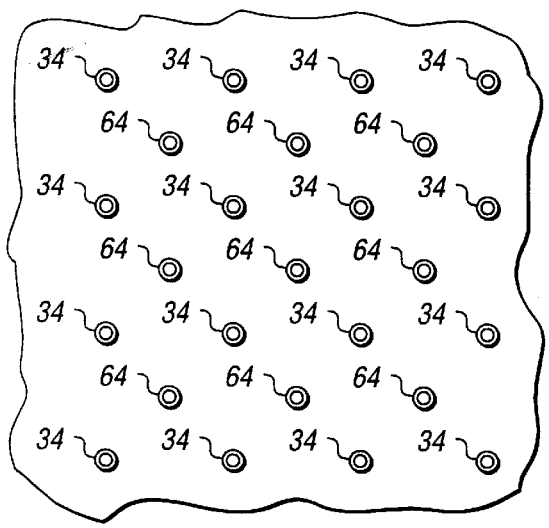
FIG. 9 is a plan view taken along the direction of line 9—9 in FIG. 2 to illustrate a first array of nozzles for providing cryogenic flows including a liquid and a second interspersed array of nozzles for providing quenching by pressurized air.

With combined reference to FIGS. 2 and 9, in addition to the first array of nozzles 34, there may also be a second array of nozzles 64 interspersed with the first array of nozzles 34 and providing pressurized air flows 66 directed toward the glass sheet to cooperate with the cryogenic flows 36 in quenching the glass sheet. This additional quenching provided by the pressurized air flows 66 in association with the cryogenic flows 36 is helpful in reducing the cost of the relatively more expensive cryogenic flows and thereby provides a more cost effective product.

Figure 10:
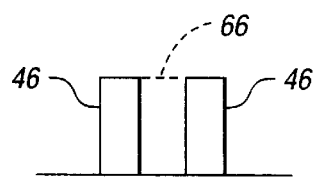
FIG. 10 is a view illustrating the manner in which the flows from the interspersed first and second arrays of nozzles can be at different times as well as continuous.

The quench unit control 30 illustrating in FIG. 1 can control both of the arrays of nozzles 34 and 64 so that the interspersed cryogenic flows 36 and pressurized air flows 66 are provided at the same time as each other. In addition, the control 30 of the quench units 28 as shown in FIG. 1 can also operate so that the interspersed cryogenic flows 36 and pressurized air flows 66 are provided at different times such as, for example, having the pressurized air flow 66 continue between pulses 46 of the cryogenic flows as illustrated in FIG. 10.

Figure 11:
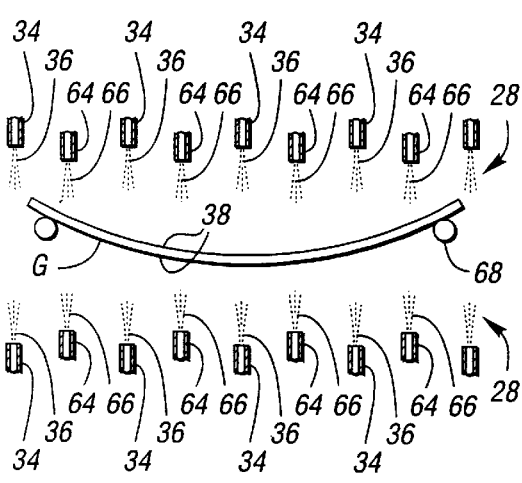
FIG. 11 is an elevational view that illustrates the manner in which the cryogenic quenching can be performed on formed glass sheets as well as on flat glass sheets.
Figure 12:
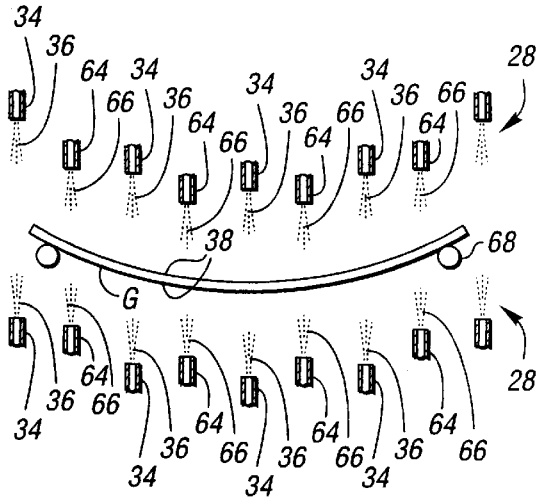
FIG. 12 illustrates the manner in which the nozzles can be spaced to conform with the shape of the formed glass sheet being quenched.

With reference to FIGS. 11 and 12, it should be appreciated that the glass sheet quenching of this invention in addition to being performed on flat glass sheets can also be performed on formed glass sheets G which may be supported by a cooling ring 68 during the quenching. In this practice, the arrays of nozzles 34 and 64 can be uniformly spaced from each other with the nozzles of each array of each quench unit at the same elevation but varying distances from the different portions of the glass sheet as shown in FIG. 11, or the arrays of nozzles 34 and 64 can be spaced at different elevations uniformly spaced from the different portions of the formed glass sheet being quenched as shown in FIG. 12.

While the best modes for carrying out the invention have been described in detail, those familiar with the art to which this invention relates will recognize various alternative designs and ways of practicing the invention as described by the following claims.

What is claimed is:

1. A process for quenching a glass sheet having oppositely facing surfaces, comprising:

directing modulated cryogenic flows that are initially completely liquid toward the oppositely facing surfaces of the glass sheet to quench the glass sheet; and wherein the cryogenic flows are started and fully stopped to provide flow pulses.

2. A process for quenching a glass sheet having oppositely facing surfaces, comprising:

directing modulated cryogenic flows that are initially completely liquid toward the oppositely facing surfaces of the glass sheet to quench the glass sheet; and wherein the cryogenic flows are continuous and have periodic increased flow pulses.

* * * * *